(12) United States Patent
Taguchi et al.

(10) Patent No.: US 11,314,528 B2
(45) Date of Patent: Apr. 26, 2022

(54) STATE CHART EXECUTION DEVICE

(71) Applicant: MITSUBISHI ELECTRIC CORPORATION, Tokyo (JP)

(72) Inventors: Shinya Taguchi, Tokyo (JP); Katsuki Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 434 days.

(21) Appl. No.: 16/338,875

(22) PCT Filed: Nov. 1, 2016

(86) PCT No.: PCT/JP2016/082430
§ 371 (c)(1),
(2) Date: Apr. 2, 2019

(87) PCT Pub. No.: WO2018/083729
PCT Pub. Date: May 11, 2018

(65) Prior Publication Data
US 2021/0286630 A1 Sep. 16, 2021

(51) Int. Cl.
*G06F 8/35* (2018.01)
*G06F 9/448* (2018.01)

(52) U.S. Cl.
CPC .............. *G06F 9/4498* (2018.02); *G06F 8/35* (2013.01); *G06F 9/4482* (2018.02); *G06F 9/4494* (2018.02)

(58) Field of Classification Search
CPC ........ G06F 8/35; G06F 9/4494; G06F 9/4498; G06F 9/4482
See application file for complete search history.

(56) References Cited

U.S. PATENT DOCUMENTS 8,244,545 B2   8/2012  Paek et al.
10,235,140 B2* 3/2019  Avadhanula .............. G06F 8/35
(Continued)

FOREIGN PATENT DOCUMENTS

JP   11-24907 A   1/1999

OTHER PUBLICATIONS

Sunitha E. V. and Philip Samuel, Automatic Code Generation From UML State Chart Diagrams, IEEE, 2019, retrieved online on Jan. 29, 2022, pp. 8591-8608. Retrieved from Internet <URL: https://ieeexplore.ieee.org/stamp/stamp.jsp?tp=&arnumber=8600324>. (Year: 2018).*

(Continued)

*Primary Examiner* — Hanh Thi-Minh Bui
(74) *Attorney, Agent, or Firm* — Birch, Stewart, Kolasch & Birch, LLP

(57) ABSTRACT

A relevance calculation unit calculates relevance between pieces of data constituting a state chart. An individual data binarization unit binarizes the pieces of data constituting the state chart. An optimal array calculation unit calculates an array of the pieces of data constituting the state chart on the basis of the relevance calculated by the relevance calculation unit. An offset setting unit sets an offset indicating a position of each of the pieces of data binarized by the individual data binarization unit in a case where the binarized pieces of data are arranged in the array calculated by the optimal array calculation unit. A binary data integration unit integrates the pieces of data each of which has been binarized by the individual data binarization unit and for each of which the corresponding offset has been set by the offset setting unit in the array calculated by the optimal array calculation unit to obtain binary data. A state chart execution unit executes processing of the state chart on the basis of the binary data.

3 Claims, 16 Drawing Sheets

(56) References Cited

U.S. PATENT DOCUMENTS

2007/0233497 A1 10/2007 Paek et al.
2013/0138593 A1 5/2013 Miller et al.

OTHER PUBLICATIONS

"State Chart XML (SCXML): State Machine Notation for Control Abstraction", W3C Recommendation Sep. 1, 2015, [Online], World Wide Web Consortium, Internet <URL: https://www.w3.org/TR/scxml/>, total 42 pages.
"Unified Modeling Language (UML) Version 2.5", Mar. 2015, [Online], Object Management Group, Internet <URL: http://www.omg.org/spec/UML/2.5/>, total 794 pages.
Iba, "Fundamentals of Genetic Algorithms—Solving the Mystery of GA", 1st Edition, Ohmsha, 1994, p. 32-34.
Gorniak et al., "Probabilistic Grounding of Situated Speech using Plan Recognition and Reference Resolution," ICMI '05 Proceedings of the 7th international conference on Multimodal interfaces, Trento, Italy, Oct. 4-6, 2005, 6 pages.

\* cited by examiner

```
<scxml initial="st1">
    <state id ="st1">
        <transition event="ev1" target="st2"> </transition>
    </state>
    <state id ="st2">
        <transition event="ev2" target="st1"> </transition>
    </state>
</scxml>
```
103

FIG. 4

| | Initial State Data (initial) | State Data 1 (st1) | State Data 2 (st2) | Transition Data 1 (ev1) | Transition Data 2 (ev2) |
|---|---|---|---|---|---|
| Initial State Data (initial) | - | 1 | 0 | 0 | 0 |
| State Data 1 (st1) | - | - | 0 | 3 | 1 |
| State Data 2 (st2) | - | - | - | 1 | 3 |
| Transition Data 1 (ev1) | - | - | - | - | 0 |
| Transition Data 2 (ev2) | - | - | - | - | - |

FIG. 6

| | initial | st1 | st2 | st21 | st22 | st3 | st4 | pa1 | ev1 | ev2 | ev3 | ev4 | ev21 | ev5 |
|---|---|---|---|---|---|---|---|---|---|---|---|---|---|---|
| ev5 | 0 | 0 | 0 | 0 | 0 | 0 | 0 | 0 | 0 | 0 | 0 | 0 | 1 | - |
| ev21 | 4 | 0 | 1 | 0 | 0 | 3 | 0 | 0 | 0 | 0 | 0 | 0 | - | - |
| ev4 | 0 | 0 | 0 | 0 | 0 | 0 | 0 | 0 | 0 | 3 | 3 | - | - | - |
| ev3 | 0 | 3 | 0 | 1 | 1 | 0 | 0 | 0 | 0 | 0 | - | - | - | - |
| ev2 | 0 | 1 | 3 | 0 | 0 | 0 | 0 | 0 | 0 | - | - | - | - | - |
| ev1 | 0 | 0 | 0 | 0 | 3 | 0 | 3 | 2 | - | - | - | - | - | - |
| pa1 | 0 | 0 | 0 | 3 | 0 | 0 | 3 | - | - | - | - | - | - | - |
| st4 | 0 | 0 | 0 | 0 | 0 | 1 | - | - | - | - | - | - | - | - |
| st3 | 0 | 0 | 0 | 0 | 0 | - | - | - | - | - | - | - | - | - |
| st22 | 0 | 0 | 0 | 0 | - | - | - | - | - | - | - | - | - | - |
| st21 | 0 | 0 | 0 | - | - | - | - | - | - | - | - | - | - | - |
| st2 | 0 | 0 | - | - | - | - | - | - | - | - | - | - | - | - |
| st1 | 0 | - | - | - | - | - | - | - | - | - | - | - | - | - |
| initial | - | - | - | - | - | - | - | - | - | - | - | - | - | - |

FIG. 7
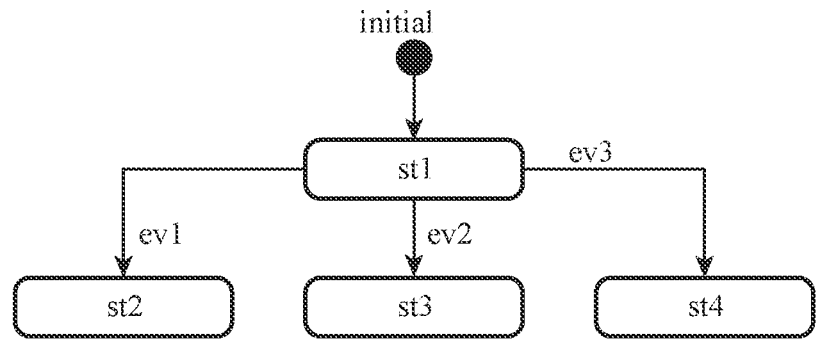
FIG. 8
|  | initial | st1 | st2 | st3 | st4 | ev1 | ev2 | ev3 |
|---|---|---|---|---|---|---|---|---|
| initial | - | 1 | 0 | 0 | 0 | 0 | 0 | 0 |
| st1 | - | - | 0 | 0 | 0 | 15 | 10 | 1 |
| st2 | - | - | - | 0 | 0 | 1 | 0 | 0 |
| st3 | - | - | - | - | 0 | 0 | 1 | 0 |
| st4 | - | - | - | - | - | 0 | 0 | 1 |
| ev1 | - | - | - | - | - | - | 0 | 0 |
| ev2 | - | - | - | - | - | - | - | 0 |
| ev3 | - | - | - | - | - | - | - | - |
FIG. 9
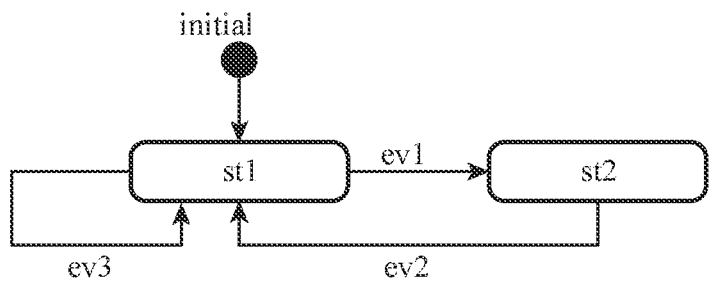

FIG. 10

|  | State Data 1 (st1) | State Data 2 (st2) | Transition Data 1 (ev1) | Transition Data 2 (ev2) | Transition Data 3 (ev3) |
|---|---|---|---|---|---|
| State Data 1 (st1) | - | 0 | 3 | 1 | 10 |
| State Data 2 (st2) | - | - | 1 | 3 | 0 |
| Transition Data 1 (ev1) | - | - | - | 0 | 0 |
| Transition Data 2 (ev2) | - | - | - | - | 0 |
| Transition Data 3 (ev3) | - | - | - | - | - |

FIG. 13A

<scxml initial="st1">

FIG. 13B

<transition event="ev1" target="st2"> </transition>

FIG. 13C

<state id ="st1">
        <transition event="ev1" target="st2"> </transition>
    </state>

FIG. 14

Permutation A

| Header Data |
| Transition Data 1 |
| Transition Data 2 |
| State Data 1 |
| State Data 2 |

Permutation B

| Header Data |
| State Data 1 |
| Transition Data 1 |
| State Data 2 |
| Transition Data 2 |

STATE CHART EXECUTION DEVICE

TECHNICAL FIELD

The present invention relates to a state chart execution device for generating and executing data of a state chart.

BACKGROUND ART

In recent years, a user interface device such as a touch panel, voice recognition, or spatial gesture recognition has been put to practical use. Furthermore, as represented by a car navigation system, a multimodal application combining a plurality of the user interface devices has been developed. As one of methods for designing a multimodal interface efficiently combining a plurality of user interface devices, a state chart (or state machine) has been widely used conventionally.

For example, Non-Patent Literature 1 describes state chart XML (SCXML) which is an extensible markup language (XML) description method of a state chart. In addition, Non-Patent Literature 2 describes a drawing rule of a state chart in unified modeling language (UML).

In addition, various methods for efficiently executing a designed state chart as a program have been proposed conventionally. For example, Patent Literature 1 describes a method for executing a state chart expressed by a table, and describes determining priority order of state transition on the basis of a result of executing a state chart. In addition, Patent Literature 2 describes a method for dynamically executing a state chart by using an associative array.

CITATION LIST

Patent Literatures

Patent Literature 1: JP H11-24907 A
Patent Literature 2: US 2013/0,138,593 A

Non-Patent Literatures

Non-Patent Literature 1: "State Chart XML (SCXML): State Machine Notation for Control Abstraction", [Online], World Wide Web Consortium, Internet <URL: https://www.w3.org/TR/scxml/>
Non-Patent Literature 2: "Unified Modeling Language (UML) Version 2.5", [Online], Object Management Group, Internet <URL: http://www.omg.org/spec/UML/2.5/>

SUMMARY OF INVENTION

Technical Problem

In a conventional method, there is a problem when a state chart having a hierarchical structure and an enormous number of states is executed on a computer, an execution speed is lowered because a data structure of the state chart is not optimized.

For example, Patent Literature 1 describes a method for determining, for each state of a state chart expressed by a table, order of transition to another state and event establishment order, on the basis of a state transition history for each state and an event establishment history for each event when the state chart is executed. However, Patent Literature 1 does not describe how to optimally arrange data on a memory of a computer by using the transition order and the establishment order. In addition, Patent Literature 1 only describes a table type state chart, and does not describe a method for determining priority of a transition destination in a state chart having a parallel state and a hierarchical state and optimally executing the state chart.

In addition, Patent Literature 2 describes that data of a state chart is held as a dynamic tree structure in order to specify the position of state data on a memory from a character string of a corresponding state name. However, in a case where a tree is constituted dynamically, when the number of states becomes enormous, a cache hit ratio decreases because related pieces of state data may be arranged at remote positions from each other on the memory, and state chart executing processing may be slow. In addition, in processing of state transition, there is no little need for processing of searching for state data by a binary tree, and therefore processing time becomes longer as the number of states increases.

The present invention has been achieved in order to solve the above problems, and an object of the present invention is to execute a state chart at high speed.

Solution to Problem

A state chart execution device according to the present invention includes: a processor to execute a program; and a memory to store the program which, when executed by the processor, performs processes of,
converting state chart information on a state chart expressing state transition into binary data; and
executing processing of the state chart on a basis of the binary data, in which
the processes further include: reading the state chart information and generating pieces of data constituting the state chart; calculating relevance between the pieces of data constituting the state chart; binarizing the pieces of data constituting the state chart; calculating an array of the pieces of data constituting the state chart on a basis of the relevance calculated by the relevance calculation unit; an offset setting unit for setting an offset indicating a position of each of the pieces of data binarized in a case where the binarized pieces of data are arranged in the array calculated; and integrating the pieces of data each of which has been binarized and for each of which the corresponding offset has been set in the array calculated to obtain the binary data.

Advantageous Effects of Invention

According to the present invention, by calculating an array of pieces of data on the basis of relevance between the pieces of data constituting a state chart and generating binary data in which a corresponding offset has been set for each of the pieces of data, the state chart can be executed at high speed on the basis of this binary data.

BRIEF DESCRIPTION OF DRAWINGS

FIG. 4 is a table showing relevance obtained from the state chart illustrated in FIG. 3A.

FIG. 6 is a table showing relevance obtained from the state chart illustrated in FIG. 5.

FIG. 7 is a diagram illustrating another example of the state chart in the first embodiment of the present invention.

FIG. 8 is a table showing relevance obtained from the state chart illustrated in FIG. 7.

FIG. 9 is a diagram illustrating another example of the state chart in the first embodiment of the present invention.

FIG. 10 is a table showing relevance obtained from the state chart illustrated in FIG. 9.

FIGS. 13A, 13B, and 13C are diagrams illustrating each piece of information included in the state chart information of FIG. 3B.

FIG. 14 is a diagram for explaining an operation performed by an optimal array calculation unit of the state chart execution device according to the first embodiment of the present invention.

DESCRIPTION OF EMBODIMENTS

Hereinafter, in order to describe the present invention in more detail, an embodiment for carrying out the present invention will be described with reference to the attached drawings.

First Embodiment

Figure 1:
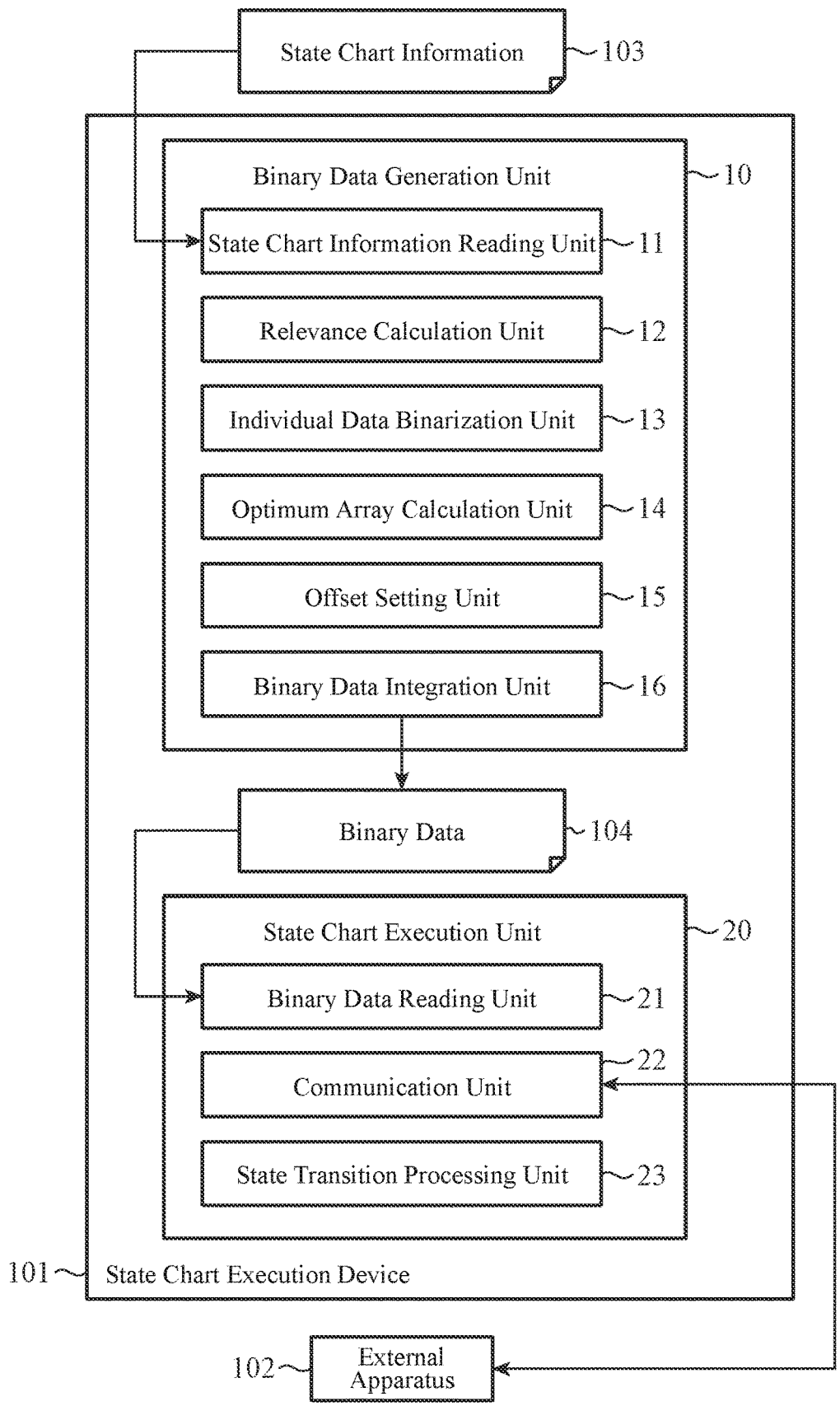
FIG. 1 is a block diagram illustrating a configuration example of a state chart execution device according to a first embodiment of the present invention.

FIG. 1 is a block diagram illustrating a configuration example of a state chart execution device 101 according to a first embodiment of the present invention. The state chart execution device 101 includes a binary data generation unit 10 and a state chart execution unit 20. The binary data generation unit 10 includes a state chart information reading unit 11, a relevance calculation unit 12, an individual data binarization unit 13, an optimal array calculation unit 14, an offset setting unit 15, and a binary data integration unit 16. The state chart execution unit 20 includes a binary data reading unit 21, a communication unit 22, and a state transition processing unit 23.

The state chart execution device 101 is connected to an external apparatus 102. The external apparatus 102 is, for example, an in-vehicle device such as a car navigation system and includes a user interface device such as a touch panel, voice recognition, or space gesture recognition. The external apparatus 102 receives a user's instruction using the user interface device and transmits the instruction to the state chart execution device 101 as event information. In addition, the external apparatus 102 receives a command from the state chart execution device 101 and operates in accordance with the command.

Figure 2:
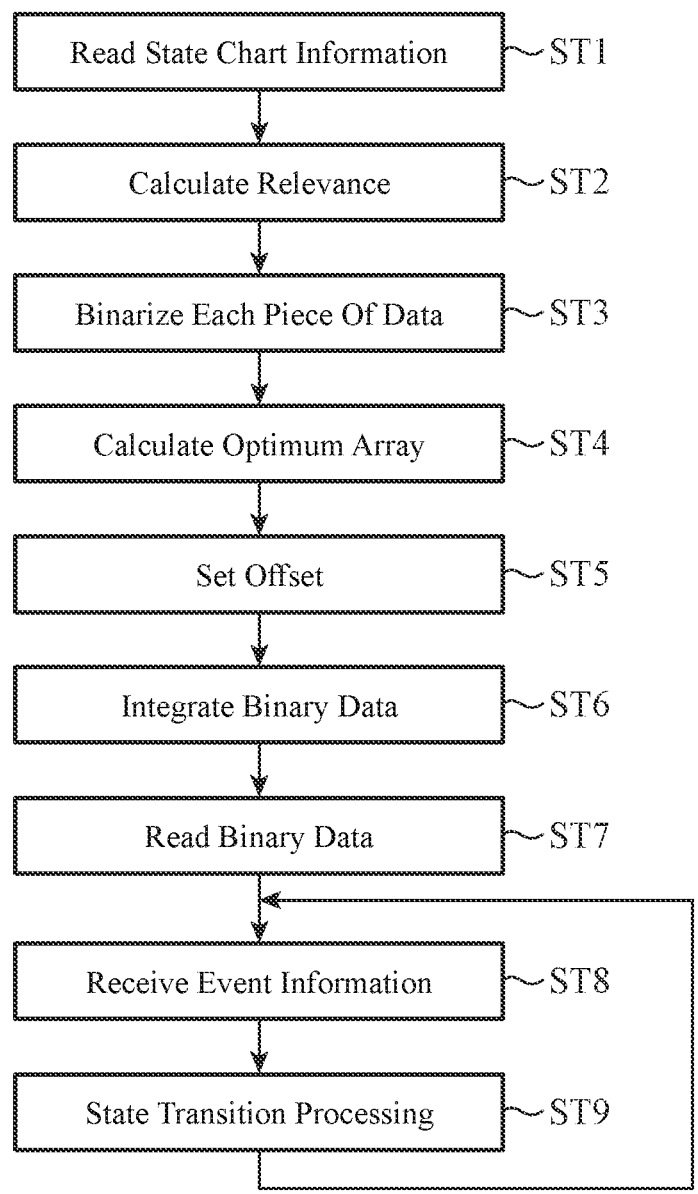
FIG. 2 is a flowchart illustrating an operation example of the state chart execution device according to the first embodiment of the present invention.

FIG. 2 is a flowchart illustrating an operation example of the state chart execution device 101 according to the first embodiment of the present invention. Processing in steps ST1 to ST6 is pre-processing performed at the time of designing a state chart. Processing in steps ST7 to ST9 is processing for executing a designed state chart.

In step ST1, the state chart information reading unit 11 reads state chart information 103 and generates data constituting a state chart.

Here, the state chart information 103 includes information such as a state and state transition constituting a state chart. In addition, the state chart information 103 may include additional information at the time of design, such as a usage frequency of each piece of data constituting a state chart, priority of state transition intentionally set by a designer, and design history. The state chart information 103 is created by a designer and is a data file of a state chart executed by the external apparatus 102.

Note that the state chart is synonymous with a state transition diagram and a state machine diagram.

Figures 3A, 3B:
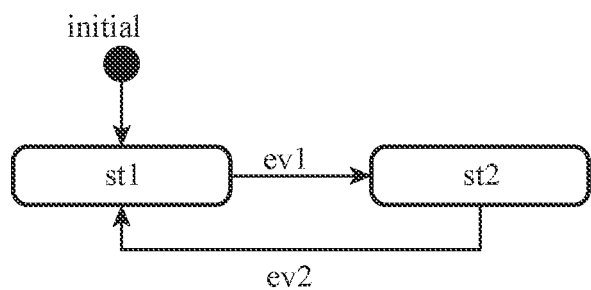
FIG. 3A is a diagram illustrating an example of a state chart according to the first embodiment of the present invention.
FIG. 3B is a diagram illustrating state chart information describing the state chart of FIG. 3A.

FIG. 3A is a diagram illustrating an example of the state chart in the first embodiment of the present invention, and FIG. 3B is a diagram illustrating the state chart information 103 corresponding to the state chart of FIG. 3A. The state chart information 103 illustrated in FIG. 3B is a text file described in an SCXML format.

Hereinafter, the first embodiment will be described by exemplifying the state chart information 103 described in the SCXML format, but the description format is not limited thereto.

Data constituting a state chart is defined as information of each element, such as an initial state, a state, state transition, a parallel state, or history, described in the state chart information 103 and constituting the state chart.

For example, transition data in SCXML is defined to refer to information of an attribute and a child element, described in a <transition> tag. In the example of SCXML illustrated in FIG. 3B, there are the following two pieces of transition data. Each of the pieces of transition data includes an event name (event) which is a child element and a state name (target) of a transition destination.

Transition data 1
   event="ev1"
   target="st2"
Transition data 2
   event="ev2"
   target="st1"

For example, state data in SCXML is defined to refer to information of an attribute and a child element, described in a <state> tag. In the SCXML example illustrated in FIG. 3B, there are the following two pieces of state data. Each of the pieces of state data includes the corresponding transition data which is a child element.

State data 1
   id="st1"
   Transition data 1
State data 2
   id="st2"
   Transition data 2

In step ST2, the relevance calculation unit 12 calculates relevance between pieces of data constituting a state chart on the basis of the state chart information 103 read by the state chart information reading unit 11.

Here, the relevance is defined. When two pieces of data are highly likely to be accessed closely in time at the time of execution of a state chart, the relevance between the pieces of data is assumed to be high. On the contrary, when two pieces of data are highly likely to be accessed remotely in time, the relevance between the pieces of data is defined to be low.

In the first embodiment, relevance calculation methods (1) to (5) are exemplified.

Relevance calculation method (1): relevance calculation based on rule

The relevance calculation unit 12 calculates relevance between pieces of data constituting a state chart on the basis of the following rules (1) to (6).

Rule (1): Relevance between transition data and state data of a transition destination is set to 1.

Rule (2): Relevance between pieces of data having a parent-child relationship is set to 3.

Rule (3): Relevance between pieces of state data in a parallel state is set to 2.

Rule (4): Relevance between self-transitioning state data and transition data is set to 4.

Rule (5): Relevance between pieces of data that do not fall under rules (1) to (4) is set to 0.

Rule (6): Relevance between an initial state and transition destination data of the initial state is set to 1.

The relevance in the above rules is an integer value of 0 to 4, but is not limited thereto, and may be a real value appropriately set by a user.

A table of relevance illustrated in FIG. 4 is obtained from the state chart illustrated in FIG. 3A by calculating relevance on the basis of the above rules. Here, with reference to FIGS. 3A and 4, a specific example of relevance calculation based on the rules will be described.

Since state data 1 (st1) includes transition data 1 (ev1) in a child element thereof, rule (2) is applied, and the relevance is 3.

Since there is no direct relationship between state data 1 (st1) and state data 2 (st2), rule (5) is applied, and the relevance is 0.

Since initial state data (initial) transitions to state data 1 (st1), rule (6) is applied, and the relevance is 1.

Figure 5:
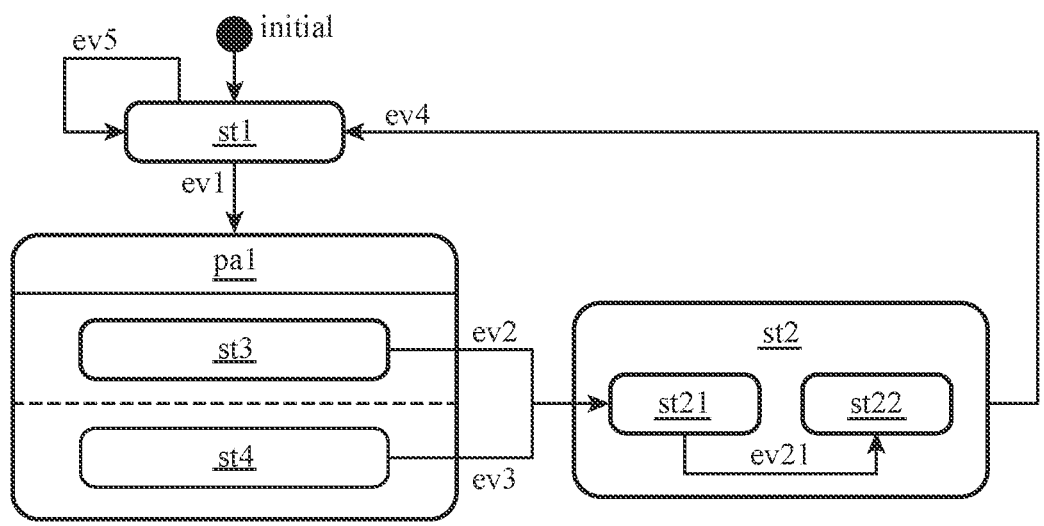
FIG. 5 is a diagram illustrating another example of the state chart in the first embodiment of the present invention.

Another example of the state chart will be illustrated. FIG. 5 is a diagram illustrating another example of the state chart in the first embodiment of the present invention. FIG. 6 is a table of relevance obtained from the state chart illustrated in FIG. 5.

From the state chart illustrated in FIG. 5, the table of relevance illustrated in FIG. 6 is obtained by using relevance calculation based on the above rules. Here, with reference to FIGS. 5 and 6, a specific example of the relevance calculation based on the rules will be described.

Hereinafter, for description, for example, state data having a state name st will be referred to as "state data st", and transition data having an event name ev will be referred to as "transition data ev".

State data st21 is set at a transition destination of transition data ev2 and transition data ev3. For this reason, rule (1) is applied, the relevance between transition data ev2 and state data st21 is 1, and the relevance between transition data ev3 and state data st21 is also 1.

Since state data st1 includes transition data ev1 in a child element thereof, rule (2) is applied, and the relevance is 3.

Parallel state data pal includes state data st3 and state data st4 in a child element thereof. For this reason, rule (2) is applied, the relevance between parallel state data pal and state data st3 is 3, and the relevance between parallel state data pal and state data st4 is also 3.

In parallel state data pal, state data st3 and state data st4 are executed in parallel. For this reason, rule (3) is applied, and the relevance between state data st3 and state data st4 is 2.

State data st2 includes state data st21 and state data st22 in a child element thereof. For this reason, rule (2) is applied, the relevance between state data st2 and state data st21 is 3, and the relevance between state data st2 and state data st22 is also 3.

Since transition data ev5 is self-transitions to state data st1, rule (4) is applied, and the relevance is 4.

Relevance calculation method (2): relevance calculation based on usage frequency The relevance calculation unit 12 may calculate relevance between pieces of data using information on a usage frequency related to each transition state.

FIG. 7 is a diagram illustrating another example of the state chart in the first embodiment of the present invention. FIG. 8 is a table showing relevance obtained from the state chart illustrated in FIG. 7. A specific example of relevance calculation based on a usage frequency will be described with reference to FIGS. 7 and 8.

For example, it is assumed that voice dialogue for an in-vehicle device such as a car navigation system is designed with a state chart and user's questions are designed and classified into the following three types.

Classification (1): user's simple and short command or a question which a car navigation system can answer with "Yes" or "No".

Question examples: "Start a car navigation system", "End navigation", "Turn to the right here?", and "Is there a roadside station nearby?"

Classification (2): a question to which a car navigation system is expected to return a complicated and long answer Question example: "What is a recommended restaurant? I want to eat ramen or curry now."

Classification (3): Error processing

Example: Processing at the time of rare occurrence of an error such as failure in starting a voice recognition device On the basis of the above classifications (1) to (3), for example, a processing flow of voice dialogue in the state chart of FIG. 7 is expressed as follows.

State data st1 is a state in which a car navigation system accepts user's questions and classifies the questions.

Transition data ev1 is a transition when classification (1) occurs.

Transition data ev2 is a transition when classification (2) occurs.

Transition data ev3 is a transition when classification (3) occurs.

State data st2 is a state in which a car navigation system performs answer processing of classification (1).

State data st3 is a state in which a car navigation system performs answer processing of classification (2).

State data st4 is a state in which a car navigation system performs answer processing of classification (3).

Here, it is assumed that information that classification (1) is frequently used, classification (2) is moderately used, and classification (3) rarely occurs is obtained in advance. The information on the usage frequency may be set manually by a user or may be determined from a tendency of a large amount of dialogue data by the relevance calculation unit 12.

The relevance calculation unit 12 determines relevance between pieces of data as described below on the basis of the information on the usage frequency.

Since a probability of passing through transition data ev1 from state data st1 is the highest, relevance between state data st1 and transition data ev1 is set to 15.

Since a probability of passing through transition data ev2 from state data st1 is the second highest, relevance between state data st1 and transition data ev2 is set to 10.

Since a probability of passing through transition data ev3 from state data st1 is the lowest, relevance between state data st1 and transition data ev3 is set to 1.

The relevance calculation unit 12 calculates relevance between pieces of data other than the above data on the basis of the rules, and obtains a table of relevance illustrated in FIG. 8. Note that the relevance values of 15, 10, and 1 based on the usage frequency are not limited thereto, and for example, may be set manually by a user, or the relevance calculation unit 12 may determine a state transition probability by simulation using a large amount of dialogue data or the like and may determine a relevance value so as to be proportional to the state transition probability.

Relevance calculation method (3): relevance calculation based on the degree of guidance There is a case in which an in-vehicle device such as a car navigation system desirably guides user's actions when teaching the user how to use the device, a route, or the like. In this case, relevance between pieces of data related to a state transition having a highly degree of desire for guidance (hereinafter referred to as "degree of guidance") may be relatively increased.

For example, a case is considered in which a car navigation system searches for a nearby restaurant by voice dialogue with a user, obtains the following three types of search results on the basis of fuel consumption cost, and presents the three types of search results to the user as options.

Option (1) Restaurant A: fuel consumption cost 1 associated with travel from current position Option (2) Restaurant B: fuel consumption cost 5 associated with travel from current position Option (3) Restaurant C: fuel consumption cost 10 associated with travel from current position On the basis of the above options (1) to (3), for example, a processing flow of voice dialogue in a case where the flow is applied to the state chart of FIG. 7 used in the relevance calculation method (2) is designed as follows.

State data st1 is a state in which options (1) to (3) are presented to a user. However, a car navigation system preferentially recommends option (1) with the lowest fuel consumption cost to the user. That is, option (1) has the highest degree of guidance. For example, a car navigation system makes display characters of option (1) larger than display characters of other options, displays option (1) at the top of a list, or recommends option (1) with voice guidance.

Transition data ev1 is a transition in a case where option (1) is selected by a user.

Transition data ev2 is a transition in a case where option (2) is selected by a user.

Transition data ev3 is a transition in a case where option (3) is selected by a user.

State data st2 is processing of a car navigation system after option (1) is selected.

State data st3 is processing of a car navigation system after option (2) is selected.

State data st4 is processing of a car navigation system after option (3) is selected.

The relevance calculation unit 12 determines relevance between pieces of data as described below on the basis of the degree of guidance.

Since the degree of guidance of option (1) is high, it is determined that a probability of passing through transition data ev1 from state data st1 is the highest. For this reason, relevance between state data st1 and transition data ev1 is set to 15.

A probability of passing through transition data ev2 from state data st1 is as low as a probability of passing through transition data ev3 from state data st1. For this reason, relevance between state data st1 and transition data ev2 is set to 1, and relevance between state data st1 and transition data ev3 is also set to 1.

Relevance calculation method (4): relevance calculation based on modification date and time of state chart The relevance calculation unit 12 may calculate relevance between pieces of data on the basis of modification date and time of a state chart at the time of design. For example, since most recently modified data is considered to be an important processing flow in a final design stage, the relevance thereof is set to a higher value than other data.

FIG. 9 is a diagram illustrating another example of the state chart in the first embodiment of the present invention. FIG. 10 is a table showing relevance obtained from the state chart illustrated in FIG. 9. A specific example of relevance calculation based on modification date and time will be described with reference to FIGS. 9 and 10.

The state chart illustrated in FIG. 9 is obtained by adding transition data ev3 to the state chart illustrated in FIG. 3A. The relevance calculation unit 12 regards the added transition data ev3 as important processing, and thus sets relevance between state data st1 and transition data ev3 to 10 which is a relatively higher value than relevance between pieces of other data, and obtains the relevance table of FIG. 10. Note that the relevance of initial state data (initial) is not illustrated in FIG. 10.

Relevance calculation method (5): relevance calculation based on modification frequency of state chart The relevance calculation unit 12 may calculate relevance between pieces of data on the basis of a modification frequency of a state chart at the time of design.

Figure 11:
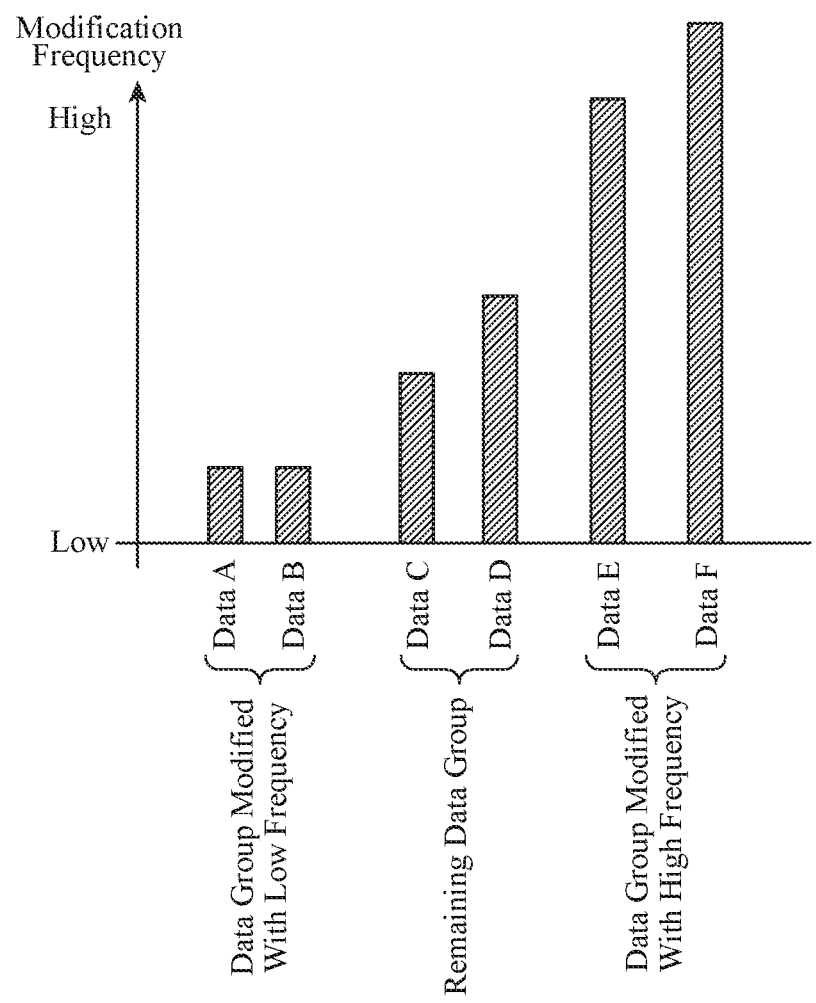
FIG. 11 is a graph illustrating a modification frequency of the state chart in the first embodiment of the present invention.

FIG. 11 is a graph illustrating a modification frequency of the state chart in the first embodiment of the present invention. At the time of designing a state chart, the relevance calculation unit 12 determines a modification frequency of each of the data A to F constituting the state chart, and classifies the data into a data group modified with a low frequency, a data group modified with a high frequency, and a remaining data group. Since the data group modified with a high frequency is highly likely to be an important processing flow in design, the relevance calculation unit 12 sets the relevance of the data group modified with a high frequency to a higher value than the relevance of the remaining data group. In addition, since the data group modified with a low frequency is highly likely to be a basic processing flow unnecessary to be modified, the relevance calculation unit 12 sets the relevance of the data group modified with a low frequency to a higher value than the relevance of the remaining data group.

In the example of FIG. 11, "1" is added to the relevance between data A and data B modified with a low frequency. Similarly, "1" is added to the relevance between data E and data F modified with a high frequency. The relevance between pieces of other data, such as the relevance between data A and data C or the relevance between data A and data E, remains unchanged. In this example, the value to be added to the relevance is "1", but the value is not limited thereto. In addition, the value to be added to the relevance of the data group modified with a low frequency and the value to be added to the relevance of the data group modified with a high frequency may be the same as or different from each other.

The relevance calculation unit 12 may calculate the relevance using any one of relevance calculation methods (1) to (5), or may calculate the relevance by combining two or more of the methods.

In step ST3, the individual data binarization unit 13 binarizes each piece of data generated by the state chart information reading unit 11. In addition, the individual data binarization unit 13 determines the size of each piece of the binarized data.

Here, a case where the state chart information 103 is described in the SCXML format illustrated in FIG. 3B will be considered.

Figure 12:
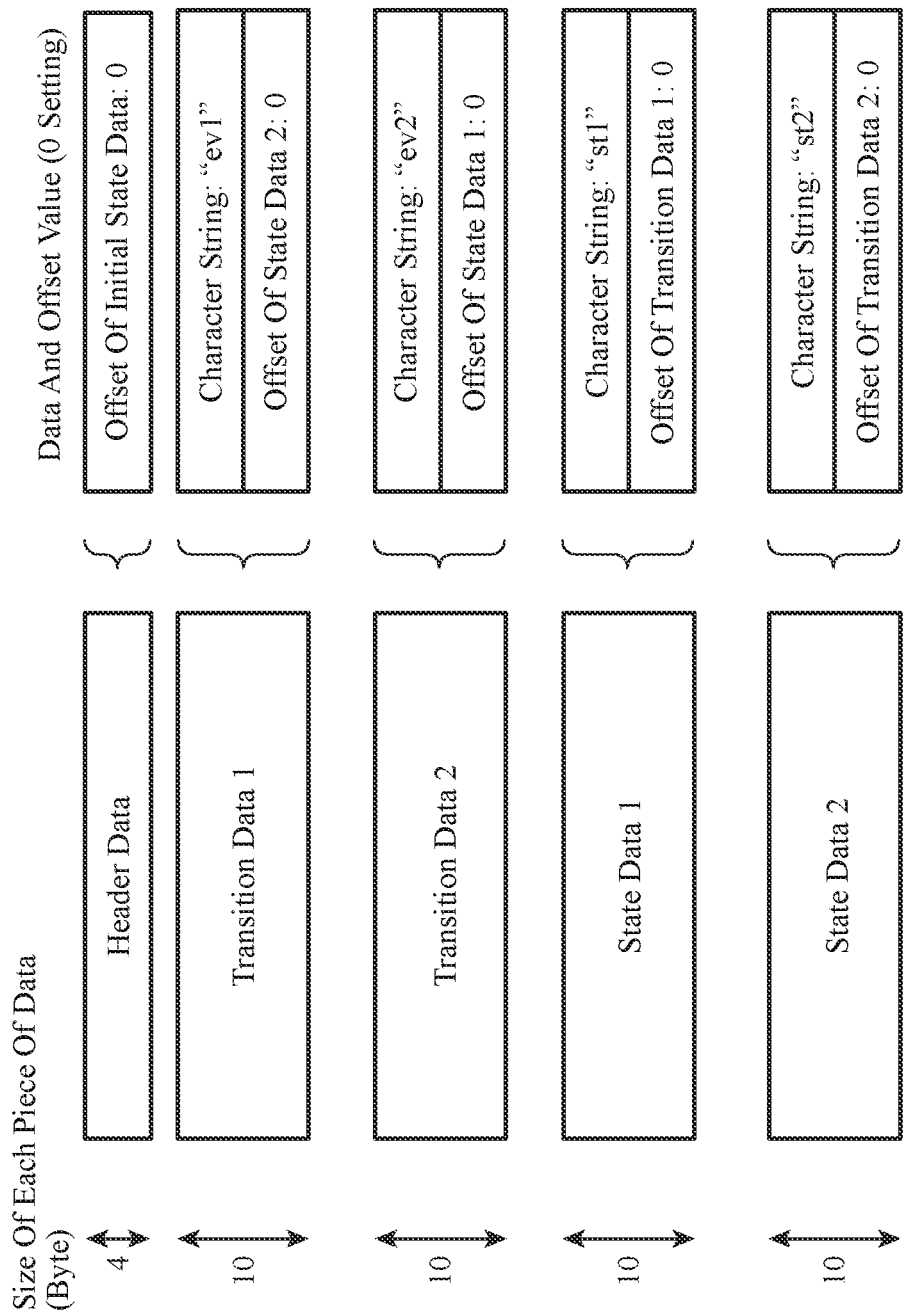
FIG. 12 is a diagram for explaining an operation performed by an individual data binarization unit of the state chart execution device according to the first embodiment of the present invention.

FIG. 12 is a diagram for explaining an operation performed by the individual data binarization unit 13 of the state chart execution device 101 according to the first embodiment of the present invention. FIGS. 13A, 13B, and 13C are diagrams illustrating each piece of information included in the state chart information 103 of FIG. 3B.

In the state chart information 103, information of initial state data st1 is described in the portion illustrated in FIG. 13A. On the basis of the information of initial state data st1, the individual data binarization unit 13 generates binarized header data as illustrated in the following (1).

(1) Offset to state data with id="st1"

The offset is a starting position of corresponding data in binary data 104 generated in later step ST6. Here, the offset is an integer value, and the data size is assumed to be 4 bytes. For this reason, the data size of the binarized header data is 4 bytes.

Since a value is substituted for the offset of the above (1) in later step ST5, in step ST3, the individual data binarization unit 13 substitutes 0 as an integer value in a pseudo manner.

In the state chart information 103, information of transition data 1 is described in the portion illustrated in FIG. 13B. The individual data binarization unit 13 binarizes the information of transition data 1 to generate the following data (1) and (2).

(1) Character string representing "ev1" of event (2) Offset to state data having id="st2" as alternative to character string of target Here, since it is assumed that the data size of one character is 2 bytes, the data size of the character string representing "ev1" in the above (1) is 6 bytes. The offset of the above (2) is an integer value of 4 bytes. Therefore, the total data size of binarized transition data 1 is 10 bytes.

In addition, since a value is substituted for the offset of the above (2) in later step ST5, in step ST3, the individual data binarization unit 13 substitutes 0 as an integer value in a pseudo manner.

In the state chart information 103, information of state data 1 is described in the portion illustrated in FIG. 13C. The individual data binarization unit 13 binarizes the information of state data 1 to generate the following data (1) and (2).

(1) Character string representing "st1" of id (2) Offset to transition data 1

As in transition data 1, since the data size of one character is also assumed to be 2 bytes in state data 1, the data size of the character string representing "st1" in the above (1) is 6 bytes. The offset of the above (2) is an integer value of 4 bytes. Therefore, the total data size of binarized state data 1 is 10 bytes.

In addition, since a value is substituted for the offset of the above (2) in later step ST5, in step ST3, the individual data binarization unit 13 substitutes 0 as an integer value in a pseudo manner.

The individual data binarization unit 13 also binarizes information of transition data 2 and state data 2 included in the state chart information 103 in a similar manner to the above.

Here, although the case where the transition information (<transition>) is included in a child element of the state information (<state>) has been described, in addition thereto, other information may be included as the state information. For example, in the case of SCXML, <onentry> and <onexit> that are child elements of the <state> tag are defined, and the individual data binarization unit 13 may binarize <onentry> and <onexit> appropriately. Similarly, in SCXML, a <script> tag which is a child element of the <transition> tag or the like may be binarized appropriately.

In step ST4, on the basis of the relevance between pieces of data calculated by the relevance calculation unit 12, the optimal array calculation unit 14 calculates a one-dimensional array of individual pieces of data so as to arrange pieces of data having high relevance as close as possible to each other, that is, an optimal permutation.

In the first embodiment, the optimal array calculation methods (1) to (3) are exemplified.

Optimal array calculation method (1): use of relevance between adjacent pieces of data The optimal array calculation unit 14 calculates total relevance obtained by summing up relevance between adjacent pieces of data when individual pieces of data constituting a state chart are arranged in a one-dimensional array, and determines a permutation of data having maximum total relevance.

FIG. 14 is a diagram for explaining an operation performed by the optimal array calculation unit 14 of the state chart execution device 101 according to the first embodiment of the present invention. The optimal array calculation unit 14 calculates total relevance of each of the permutations A and B illustrated in FIG. 14 using the relevance table of FIG. 4.

In a case where individual pieces of data are arranged in a one-dimensional array in accordance with permutation A, the total relevance is 1.

$$\begin{aligned}\text{Total relevance} = &\text{ (relevance between header data and transition data 1)} + \\ &\text{ (relevance between transition data 1 and transition data 2)} + \\ &\text{ (relevance between transition data 2 and state data 1)} + \\ &\text{ (relevance between state data 1 and state data 2)} = 0 + 0 + 1 + 0 = 1\end{aligned}$$

In a case where individual pieces of data are arranged in a one-dimensional array in accordance with permutation B, the total relevance is 8.

Total relevance = (relevance between header data and state data 1) +

(relevance between state data 1 and transition data 1) +

(relevance between transition data 1 and state data 2) +

(relevance between state data 2 and transition data 2) =

1 + 3 + 1 + 3 = 8

The optimal array calculation unit 14 selects permutation B having large total relevance. Although description is omitted, the optimal array calculation unit 14 enumerates all permutations that can be considered similarly or enumerates permutation candidates by stochastic sampling, calculates the total relevance thereof, and selects a permutation having maximum total relevance.

A calculation formula of the total relevance is an evaluation function for determining an optimal permutation of data.

Incidentally, in the example of FIG. 14, the total relevance is determined by adding relevance of one piece of data adjacent to a target piece of data, but the total relevance may be determined by adding relevance values of N (N>1) pieces of data adjacent to a target piece of data. For example, in a case where relevance values of two adjacent pieces of data are considered, the optimal array calculation unit 14 adds relevance values of state data 1 and transition data 1 to target header data in permutation B of FIG. 14. As a result, the total relevance of permutation B for N=2 is 8.

Total relevance of permutation B for N =

2 = (relevance between header data and state data 1) +

(relevance between head data 1 and transition data 1) +

(relevance between state data 1 and state data 2) +

(relevance between transition data 1 and state data 2) +

(relevance between transition data 1 and transition data 2) +

(relevance between state data 2 and transition data 2) =

1 + 0 + 3 + 0 + 1 + 0 + 3 = 8

As a result, when individual one-dimensionally arranged pieces of data are expanded on a memory, related pieces of data are arranged close to each other, and therefore a cache hit ratio at the time of execution of a state chart is improved, and state transition processing can be performed at high speed. In addition, since only adjacent N relevance values are taken into consideration, the calculation amount can be suppressed in calculation of the total relevance.

Optimal array calculation method (2): use of distance and relevance between pieces of data The optimal array calculation unit 14 may set an evaluation function so that the relevance between pieces of data decreases as a distance between the pieces of data increases, and may determine a permutation of data which maximizes the evaluation function.

An example of the evaluation function is illustrated below.

Definition of Variables

M: the number of pieces of data

E: set of permutations of pieces of data constituting state chart. The number of elements is M!.

s(i): i-th data constituting state chart s(j): j-th data constituting state chart r(i, j): relevance between s(j) and s(i)

d(e, i, j): distance between s(j) and s(i) when pieces of data are arranged one-dimensionally in accordance with permutation e∈E. That is, d(e, i, j) is an absolute value of a difference in offset (data starting position) between s(j) and s(i).

At this time, the optimum array calculation unit 14 sets an evaluation function as illustrated in the following formula (1). Then, the optimum array calculation unit 14 determines a permutation of data which maximizes the evaluation function, that is, an optimal data arrangement e, by using the following formula (2).

$$V(e) = \sum_{i,j} r(i, j) \frac{1}{d(e, i, j)} \quad (1)$$

$$\hat{e} = \mathrm{argmax}_e (V(e)) \quad (2)$$

As a result, when individual one-dimensionally arranged piece of data are expanded on a memory, related pieces of data are arranged as close as possible to each other, and therefore a cache hit ratio at the time of execution of a state chart is improved, and state transition processing can be performed at high speed. In addition, since relevance between all the pieces of data is considered, it is expected that a more optimal permutation of data can be determined as compared with optimal array calculation method (1).

Optimal array calculation method (3): use of distance and relevance between pieces of data and a threshold value The optimal array calculation unit 14 may sum up relevance between pieces of data that are separated by a distance equal to or more than a predetermined distance to take the total relevance as a cost function, and may determine a permutation of data minimizing the cost function. Here, the predetermined distance is defined as threshold value B1. For example, as threshold value B1, the block size or the line size of a cache memory of a central processing unit (CPU) is set. This makes it possible to determine a permutation of data reducing cache misses.

An example of the cost function is illustrated below.

Definition of variables

E: set of permutations of pieces of data constituting state chart

B1: the above threshold value s(i): i-th data constituting state chart s(j): j-th data constituting state chart r(i, j): relevance between s(j) and s(i)

d(e, i, j): distance between s(j) and s(i) when pieces of data are arranged one-dimensionally in accordance with permutation e∈E.

X1(e): set of i and j satisfying d(e,i,j)>B1

At this time, the optimal array calculation unit 14 defines a cost function as illustrated in the following formula (3).

$$C(e) = \Sigma_{i,j \in X1(e)} r(i,j) * d(e,i,j) \quad (3)$$

Alternatively, in a case where a CPU having cache memories of different block sizes is used, the optimal array calculation unit 14 may set a larger block size or line size as threshold value B2 and may define a cost function as illustrated in the following formula (4).

$$C(e)=\alpha\Sigma_{i,j\in X1(e)}r(i,j)*d(e,i,j)+\beta\Sigma_{i,j\in X2(e)}r(i,j)*d(e,i,j) \quad (4)$$

B2: threshold value satisfying B1<B2 (block size or the like of cache memory)

X2(e): set of i and j satisfying d(e,i,j)>B2

α, β: appropriate weighting factors

The optimum array calculation unit 14 determines a permutation of data which minimizes the cost function of the above formula (3) or (4), that is, an optimal data arrangement e, by using the following formula (5).

$$\hat{e}=\text{argmin}_e(C(e)) \quad (5)$$

This makes it possible to minimize a pair of pieces of data that do not fit in the block size or the line size of a cache memory when individual one-dimensionally arranged piece of data is expanded on the memory. This makes it possible to reduce cache misses at the time of execution of a state chart and to perform state transition processing at high speed.

Incidentally, in a case where the evaluation function is maximized or the cost function is minimized, an increase in the number of pieces of data increases the amount of calculation and makes it difficult to determine an optimal solution of a permutation within a realistic time. Therefore, a quasi-optimal solution maximizing the evaluation function or minimizing the cost function may be determined.

The optimal array calculation unit 14 can use a probabilistic optimization method such as a genetic algorithm, as a method for determining a quasi-optimal solution. For example, the optimal array calculation unit 14 expresses a permutation of data constituting a state chart by the ordinal representation described on page 34 of the following literature, and determines a permutation maximizing the evaluation function indicated in optimal array calculation method (1) or (2) or a permutation minimizing at least one of the cost functions indicated in optimal array calculation method (3) by using a genetic algorithm.

Hitoshi Iba, "Fundamentals of Genetic Algorithms-Solving the Mystery of GA", 1st Edition, Ohmsha, 1994, p. 34

In step ST5, the offset setting unit 15 determines an offset of each piece of data in a case where binarized pieces of data are arranged one-dimensionally in accordance with the permutation calculated by the optimal array calculation unit 14, and sets the corresponding offset in each piece of data. The offset is a starting position of corresponding data in the binary data 104.

Figure 15:
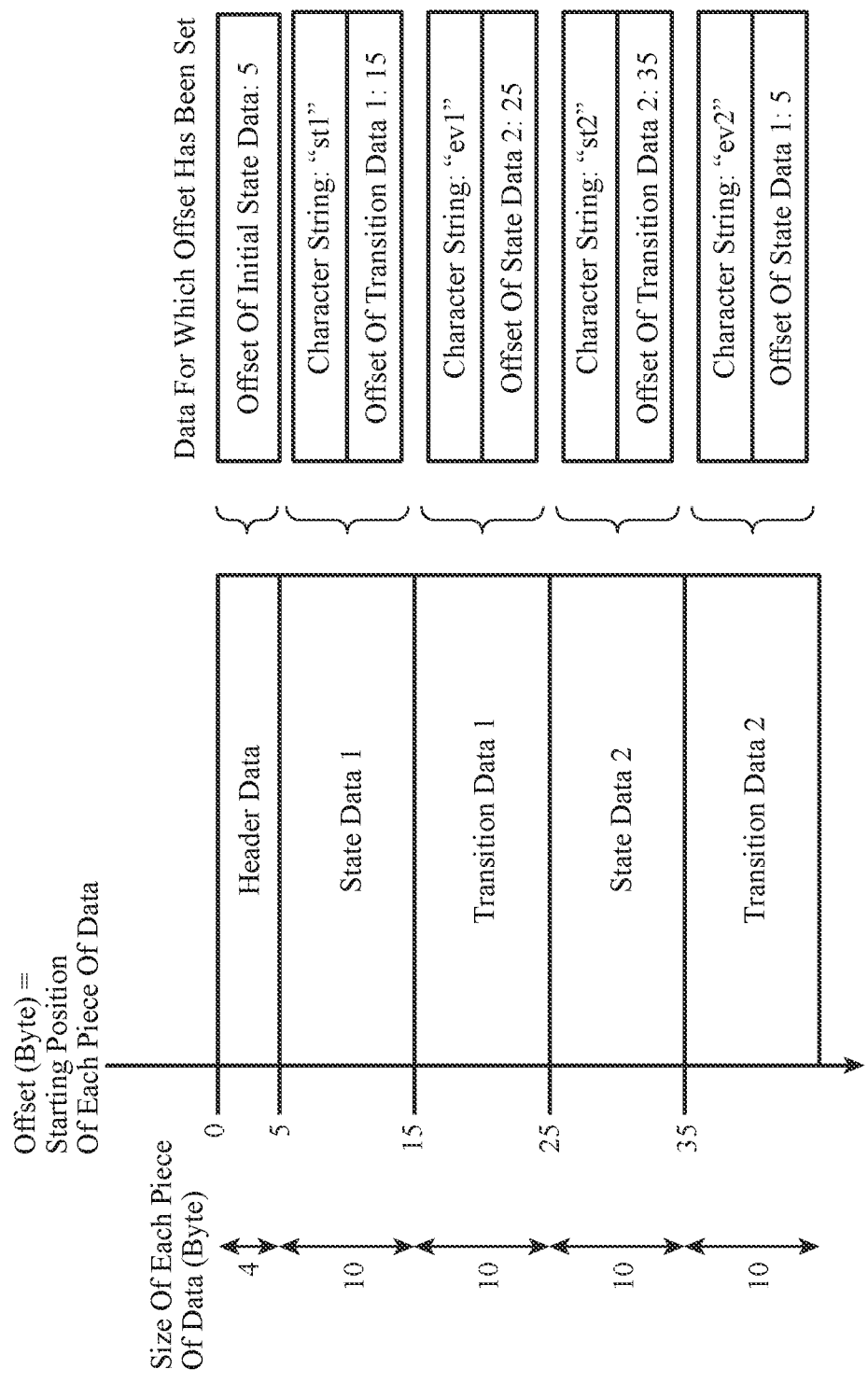
FIG. 15 is a diagram for explaining an example of an operation performed by an offset setting unit of the state chart execution device according to the first embodiment of the present invention.

FIG. 15 is a diagram for explaining an example of an operation performed by the offset setting unit 15 of the state chart execution device 101 according to the first embodiment of the present invention. Here, it is assumed that the optimal array calculation unit 14 selects permutation B in FIG. 14 and outputs permutation B to the offset setting unit 15.

The offset setting unit 15 arranges pieces of data constituting a state data in accordance with the order of permutation B. As a result, as illustrated in FIG. 15, the pieces of data are arranged in the order of header data, state data 1, transition data 1, state data 2, and transition data 2.

The data size of the header data is 4 bytes, the data size of state data 1 is 10 bytes, the data size of transition data 1 is 10 bytes, the data size of state data 2 is 10 bytes, and the data size of transition data 2 is 10 bytes. Accordingly, the offset setting unit 15 calculates the offset of the header data as the 0th byte, the offset of state data 1 as the 5th byte, the offset of transition data 1 as the 15th byte, the offset of state data 2 as the 25th byte, and the offset of transition data 2 as the 35th byte.

Subsequently, the offset setting unit 15 resets each offset provisionally set to 0 in step ST3 to a corresponding calculated correct value. For example, the offset setting unit 15 sets 5, which is the offset of state data 1, as the offset of initial state data. The offset setting unit 15 sets 15 as the "offset of transition data 1" of state data 1. The offset setting unit 15 sets 25 as the "offset of state data 2" of transition data 1. Similarly, the offset setting unit 15 also sets a value as each of the offsets of state data 2 and transition data 2.

In FIG. 15, a method in which the offset setting unit 15 binarizes the state chart information 103 using an offset has been described. However, for example, in a case where state data is changed and the data size thereof increases, it is necessary to recalculate the offsets set for all pieces of the data disadvantageously.

Therefore, in the following description, a method in which the offset setting unit 15 efficiently binarizes data by using offset array data and an index of the offset array data will be described.

Figure 16:
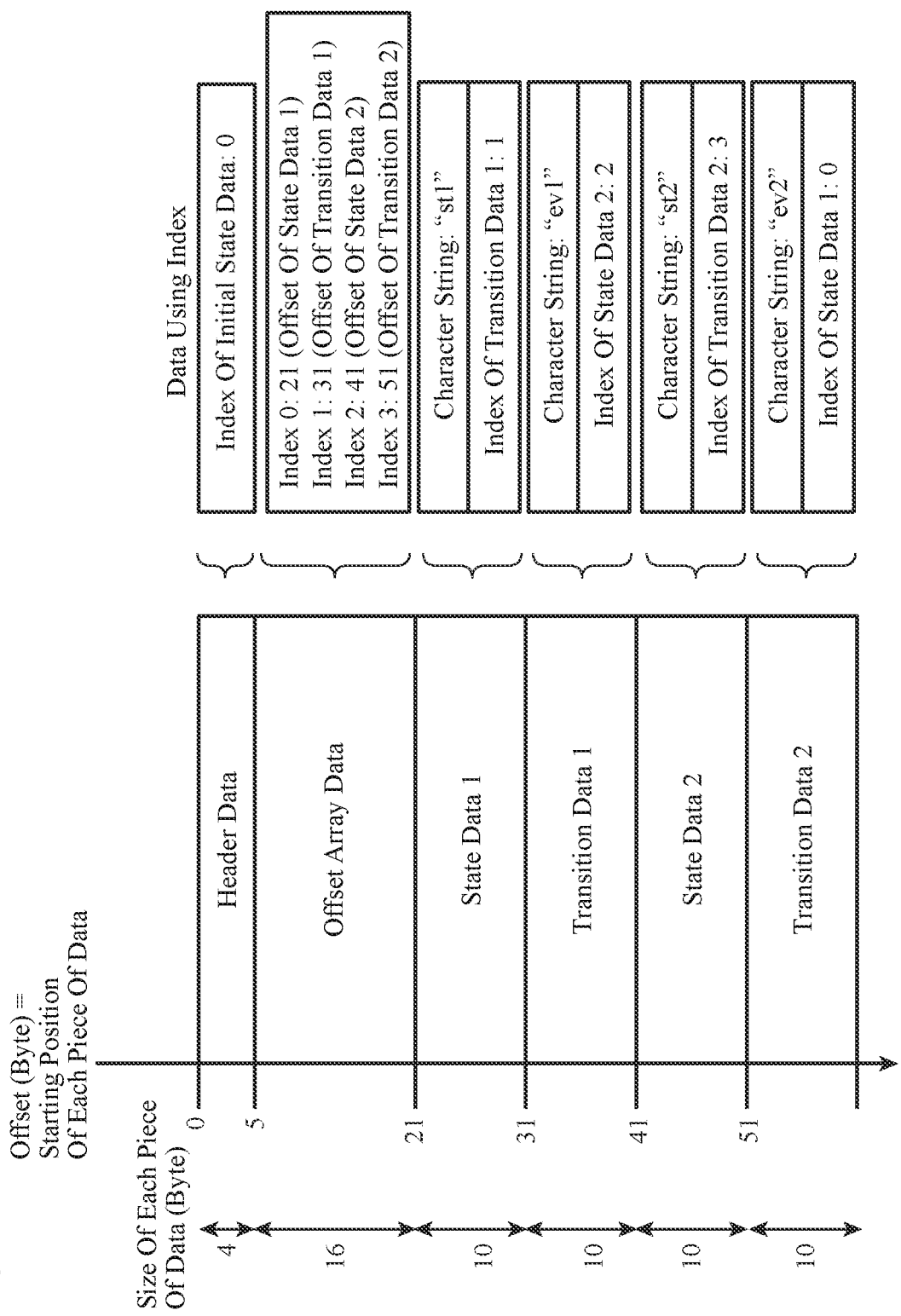
FIG. 16 is a diagram for explaining another example of the operation performed by the offset setting unit of the state chart execution device according to the first embodiment of the present invention.

FIG. 16 is a diagram for explaining another example of the operation performed by the offset setting unit 15 of the state chart execution device 101 according to the first embodiment of the present invention. Here, it is assumed that the optimal array calculation unit 14 selects permutation B in FIG. 14 and outputs permutation B to the offset setting unit 15.

The offset setting unit 15 additionally prepares offset array data and arranges pieces of data in the order of header data, the offset array data, state data 1, transition data 1, state data 2, and transition data 2.

In the offset array data, an index 0 corresponding to the offset of state data 1, an index 1 corresponding to the offset of transition data 1, an index 2 corresponding to the offset of state data 2, and an index 3 corresponding to the offset of transition data 2 are defied. Since one offset is an integer value of 4 bytes, the data size of the offset array data is 4 bytes×4=16 bytes. The offset setting unit 15 sets offset values to indexes 0 to 3 as described below.

Index 0: 21 (offset of state data 1)
Index 1: 31 (offset of transition data 1)
Index 2: 41 (offset of state data 2)
Index 3: 51 (offset of transition data 2)

Subsequently, for each of state data 1, transition data 1, state data 2, and transition data 2, the offset setting unit 15 specifies the corresponding index in the offset array data, as an alternative to the corresponding offset value.

For example, in FIG. 15, "offset of transition data 1" (offset value 15) is set in state data 1, but as an alternative thereto, index 1 in the offset array data is set in FIG. 16. This is because index 1 is set to 31, which is the offset of transition data 1, in the offset array data.

As described above, by using the offset array data, even in a case where the data size is changed, it is only necessary to change the offset array data. For example, in a case where the character string of state data 1 is changed from "st1" to "st1_new" to increase the number of characters, when one character is 2 bytes, the data size of state data 1 increases by 8 bytes. Therefore, in the offset array data, the offset setting unit 15 increases the offset of each of transition data 1, state data 1, and transition data 2 by 8 bytes, and changes the offset array data as follows.

Index 0: 21 (offset of state data 1)
Index 1: 39 (offset of transition data 1)
Index 2: 49 (offset of state data 2)
Index 3: 59 (offset of transition data 2)

As a result, the offset indicates a correct position of corresponding data. At this time, since the permutation of data has not been changed, it is unnecessary to change the index set for each piece of data. Therefore, it is unnecessary to rewrite the contents of each piece of data.

In step ST6, the binary data integration unit 16 integrates the pieces of data each of which has been binarized by the individual data binarization unit 13 and for each of which the offset or the offset array data has been set by the offset setting unit 15 in the array calculated by the optimal array calculation unit 14 to obtain the binary data 104, and stores the binary data 104. The binary data integration unit 16 may store the binary data 104 in a memory such as a random access memory (RAM), or may store the binary data 104 on a disk in a file format or the like.

Next, an operation of the state chart execution unit 20 will be described.

In step ST7, the binary data reading unit 21 reads the stored binary data 104. For example, in a case where the binary data 104 is stored as a binary file, the binary data reading unit 21 first secures a memory corresponding to the binary data size and stores all pieces of data constituting a state chart on the secured memory.

In step ST8, the communication unit 22 communicates with the external apparatus 102 and receives event information from the external apparatus 102. The event information indicates a character string indicating the name of an event and any data accompanying the event.

Figure 17:
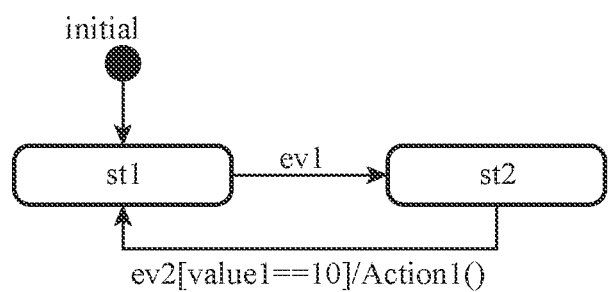
FIG. 17 is a diagram illustrating another example of the state chart in the first embodiment of the present invention.

FIG. 17 is a diagram illustrating another example of the state chart in the first embodiment of the present invention. In this state chart, the communication unit 22 receives an event character string of "ev1" or an event character string of "ev2" and accompanying data value 1==10.

In step ST9, the state transition processing unit 23 executes state transition processing in accordance with the event character string and the accompanying data received by the communication unit 22, and the binary data 104 read by the binary data reading unit 21 in step ST7.

Figure 18:
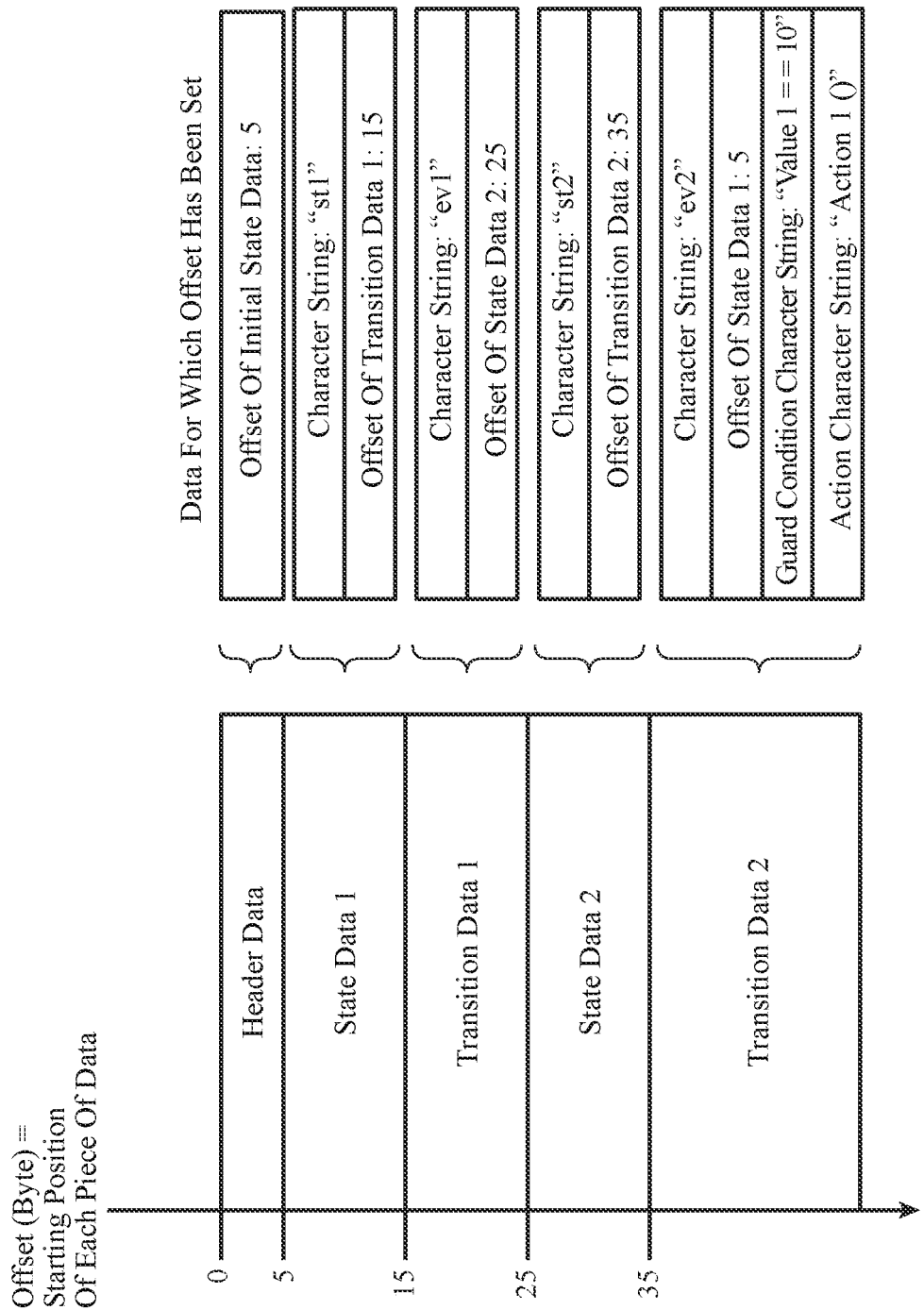
FIG. 18 is a diagram illustrating binary data corresponding to the state chart of FIG. 17.

Here, an example of processing in steps ST7 to ST9 will be described with reference to FIGS. 17 and 18. FIG. 17 illustrates a state chart including guard condition "value 1==10" and an action Action 1 ( ) in transition data 2 of event ev2. FIG. 18 is a diagram illustrating the binary data 104 corresponding to the state chart of FIG. 17. In addition to the event name and the offset to state data 1, transition data 2 includes a guard condition character string "value 1==10" and an action character string "Action 1 ( )".

1. Initial Transition (Step ST7)

The binary data reading unit 21 first reads header data of the binary data 104 and accesses initial state data described in the header data. In the example of FIG. 18, a value of 5 is set as the offset of the initial state data. Therefore, the binary data reading unit 21 accesses data of the fifth byte in the binary data 104 and reads state data 1. As a result, the initial state of the state chart is st1.

2. Reception of Event "Ev1" (Step ST8)

Next, the communication unit 22 receives event information from the external apparatus 102. Here, it is assumed that, for example, the event character string "ev1" is received.

3. State Transition (Step ST9)

Next, the state transition processing unit 23 refers to the offset of transition data 1 of state data 1 and reads transition data 1 of the 15th byte. Since this transition data 1 includes the event name "ev1" and the event name "ev1" is the same as the previously received event character string "ev1", the state transition processing unit 23 transits to state data 2 of a transition destination. Specifically, the state transition processing unit 23 accesses data of the 25th byte set as the offset of state data 2 of the transition destination. As a result, the state transition processing unit 23 transits to state "st2" described in state data 2.

Since the offset of the transition destination data is set to 25 bytes, when the state transition processing unit 23 makes a state transition, the state transition processing unit 23 can access next transition information without requiring search processing.

Meanwhile, when the event name of transition data 1 is not the same as the received event character string, the state transition processing unit 23 remains in state "st1".

4. Reception of Event "Ev2" and Accompanying Data (Step ST8)

Next, the communication unit 22 receives the event character string "ev2" and data value 1==10 accompanying the event character string "ev2" from the external apparatus 102.

5. State Transition (Step ST9)

Next, the state transition processing unit 23 accesses transition data 2 and judges whether or not the event name "ev2" of transition data 2 is the same as the received event character string "ev2". Here, since the event name of transition data 2 is the same as the received event character string, the state transition processing unit 23 proceeds to next guard condition judgement. When the event name of transition data 2 is not the same as the received event character string, the state transition processing unit 23 remains in state "st2".

6. Guard Condition Judgement and Action Execution (Step ST9)

Next, the state transition processing unit 23 compares a guard condition character string described in transition data 2 with a guard condition character string of the accompanying data received from the external apparatus 102, and judges whether the guard condition character string is true or false. When the guard condition character string is true, the state transition processing unit 23 executes an action described in the action data and transitions to a next state. Here, since the received accompanying data is value 1==10, the guard condition character string described in FIG. 18 is true. Therefore, the state transition processing unit 23 acquires an action character string "Action 1 ( )" and executes Action 1 ( ). Action 1 ( ) is a function or the like registered in the external apparatus 102, and for example, describes a command to cause the state chart execution unit 20 to transmit event information to the specific external apparatus 102 via the communication unit 22. Finally, the state transition processing unit 23 accesses data of the fifth byte set to the offset of state data 1, and transits to a next state "st1".

Meanwhile, when the guard condition character string is false, the state transition processing unit 23 remains in state "st2".

In this manner, the state chart execution unit 20 repeats reception of an event character string in step ST8 and state transition processing in step ST9.

Next, an example of a hardware configuration of the state chart execution device 101 will be described.

Figure 19A:
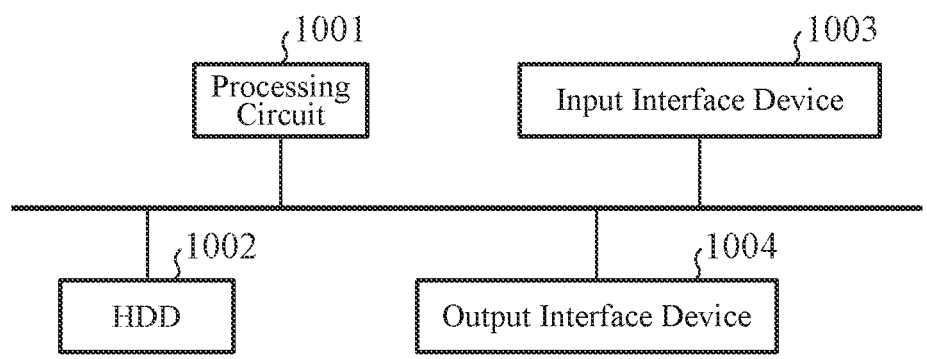
FIGS. 19A and 19B are diagrams illustrating an example of a hardware configuration of the state chart execution device according to the first embodiment of the present invention.
Figure 19B:
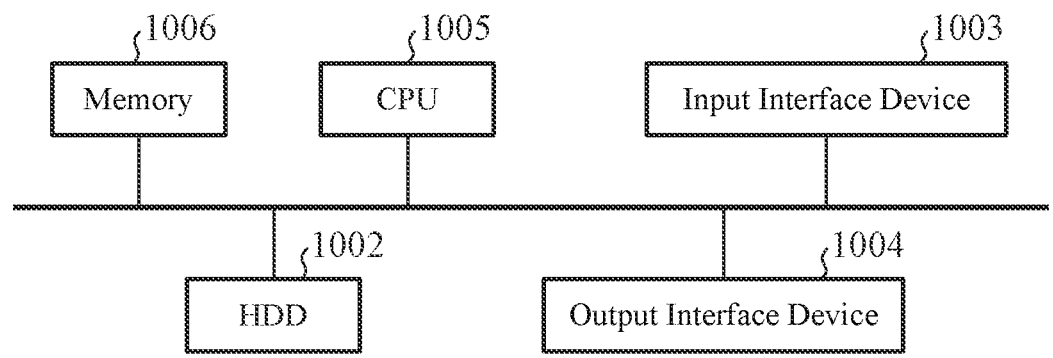

FIGS. 19A and 19B are diagrams each illustrating an example of a hardware configuration of the state chart execution device 101 according to the first embodiment of the present invention.

Each of functions of the binary data generation unit 10 and the state chart execution unit 20 in the state chart execution device 101 is implemented by a processing circuit. That is, the state chart execution device 101 includes a processing circuit for converting the state chart information 103 on a state chart expressing state transition into the binary data 104 and executing processing of the state chart on the basis of the binary data 104. The processing circuit may be dedicated hardware as illustrated in FIG. 19A, or may be a CPU 1005 for executing a program stored in a memory 1006 as illustrated in FIG. 19B.

As illustrated in FIG. 19A, in a case where the processing circuit is dedicated hardware, to the processing circuit 1001, for example, a single circuit, a composite circuit, a programmed processor, a parallel programmed processor, an application specific integrated circuit (ASIC), a field-programmable gate array (FPGA), or a combination thereof corresponds.

The functions of the binary data generation unit 10 and the state chart execution unit 20 may be collectively implemented by the one processing circuit 1001 or may be implemented by a plurality of the processing circuits 1001.

As illustrated in FIG. 19B, in a case where the processing circuit is the CPU 1005, the functions of the binary data generation unit 10 and the state chart execution unit 20 are implemented by software, firmware, or a combination of the software and the firmware. The software or the firmware is described as a program and stored in a hard disk drive (HDD) 1002 or the memory 1006. The CPU 1005 reads and executes the program stored in the HDD 1002 or the memory 1006 to execute the function of each unit. That is, the state chart execution device 101 includes the HDD 1002 or the memory 1006 for storing a program that causes the steps illustrated in FIG. 2 to be executed as a result when the program is executed by the CPU 1005. It can also be said that this program causes a computer to execute procedures or methods of the binary data generation unit 10 and the state chart execution unit 20.

Here, the CPU 1005 may be, for example, a processing device, a computing device, a microprocessor, a microcomputer, or a system large-scale integration (LSI).

In addition, the CPU 1005 may include a plurality of cache memories such as a primary cache memory and a secondary cache memory. When implementing the function of the binary data reading unit 21, the CPU 1005 reads the binary data 104 and expands the binary data 104 on a cache memory.

To the memory 1006, for example, a nonvolatile or volatile semiconductor memory such as RAM, read only memory (ROM), a flash memory, erasable programmable ROM (EPROM), or electrically EPROM (EEPROM), a magnetic disk, a flexible disk, an optical disc, a compact disc, a mini disc, or a digital versatile disc (DVD) corresponds.

Note that some of the functions of the binary data generation unit 10 and the state chart execution unit 20 may be implemented by dedicated hardware, and some of the functions may be implemented by software or firmware. For example, the function of the state chart execution unit 20 can be implemented by the processing circuit 1001 as dedicated hardware, and the function of the binary data generation unit 10 can be implemented by reading out and executing a program stored in the memory 1006 by the CPU 1005.

The state chart information 103 input to the binary data generation unit 10 and the binary data 104 generated by the binary data generation unit 10 are stored in, for example, the HDD 1002. Note that this is only an example, and the state chart information 103 and the binary data 104 may bestoted in the memory 1006 such as a DVD.

The communication unit 22 in the state chart execution device 101 corresponds to an input interface device 1003 and an output interface device 1004. The input interface device 1003 receives information from the external apparatus 102. The output interface device 1004 transmits information to the external apparatus 102.

Like the state chart execution device 101, the external apparatus 102 may be dedicated hardware or a CPU for executing a program stored in a memory.

The processing circuit 1001 or the CPU 1005 constituting the state chart execution device 101 may implement not only the function of the state chart execution device 101 but also the function of the external apparatus 102. For example, a CPU of a car navigation system may implement each of the functions of the state chart execution device 101 and the external apparatus 102. Alternatively, for example, a CPU of a computer may implement the function of the binary data generation unit 10, and a CPU of a car navigation system may implement each of the functions of the state chart execution unit 20 and the external apparatus 102.

As described above, the state chart execution device 101 according to the first embodiment includes the binary data generation unit 10 for converting the state chart information 103 on a state chart expressing state transition into the binary data 104 and the state chart execution unit 20 for executing processing of the state chart on the basis of the binary data 104. The binary data generation unit 10 includes: the state chart information reading unit 11 for reading the state chart information 103 and generating pieces of data constituting the state chart; the relevance calculation unit 12 for calculating relevance between the pieces of data constituting the state chart; the individual data binarization unit 13 for binarizing the pieces of data constituting the state chart; the optimal array calculation unit 14 for calculating an array of the pieces of data constituting the state chart on the basis of the relevance calculated by the relevance calculation unit 12; the offset setting unit 15 for setting an offset indicating a position of each of the pieces of data binarized by the individual data binarization unit 13 in a case where the binarized pieces of data are arranged in the array calculated by the optimal array calculation unit 14; and the binary data integration unit 16 for integrating the pieces of data each of which has been binarized by the individual data binarization unit 13 and for each of which the offset has been set by the offset setting unit 15 in the array calculated by the optimal array calculation unit 14 to obtain the binary data 104. This makes it possible to obtain the binary data 104 in which the data structure of a state chart is optimized. The state chart execution unit 20 can execute a state chart at high speed on the basis of the binary data 104.

Specifically, the optimal array calculation unit 14 calculates an array so as to arrange pieces of data having high relevance close to each other on the basis of the relevance calculated by the relevance calculation unit 12.

The optimal array calculation unit 14 determines a permutation of data so as to optimize the evaluation function or the cost function, and it is thereby possible to arrange pieces of data having high relevance close to each other on a memory. As a result, when the state chart execution unit 20 executes a state chart, improvement in a cache hit ratio of the CPU and reduction in cache misses are expected, and therefore the processing of the state chart is expected to be performed at high speed.

In addition, the binary data generation unit 10 binarizes the state chart information 103, and the binary data 104 is arranged in a continuous memory area to cause no memory fragmentation. As a result, performance of memory allocation processing by the binary data reading unit 21 at high speed and improvement in a cache hit ratio at the time of execution of a state chart by the state transition processing unit 23 are expected.

The offset setting unit 15 sets an offset for each of pieces of data constituting a state chart. The state chart execution unit 20 includes: the binary data reading unit 21 for reading the binary data 104; the communication unit 22 for receiving event information from the external apparatus 102; and the state transition processing unit 23 for accessing data at a position indicated by the offset set in the binary data 104 when executing state transition processing of the state chart in accordance with the event information received by the communication unit 22.

By the data access using the offset, the state transition processing unit 23 can directly access state data of a transition destination when executing state transition processing. For this reason, processing of searching for state data with a character string of a state name does not occur, and it is possible to perform the state transition processing at high speed.

The binary data generation unit 10 can also calculate relevance between pieces of data constituting not only a state chart in table expression but also a state chart having a hierarchical state or a parallel state, and convert the relevance into a one-dimensional array to obtain the binary data 104.

Note that any component in the embodiment can be modified, or any component in the embodiment can be omitted within the scope of the present invention.

INDUSTRIAL APPLICABILITY

Since the state chart execution device according to the present invention executes a state chart at high speed, the state chart execution device is suitable for a state chart execution device used for an external apparatus including a user interface device such as a touch panel, voice recognition, or space gesture recognition.

REFERENCE SIGNS LIST

10: Binary data generation unit, 11: State chart information reading unit, 12: Relevance calculation unit, 13: Individual data binarization unit, 14: Optimal array calculation unit, 15: Offset setting unit, 16: Binary data integration unit, 20: State chart execution unit, 21: Binary data reading unit, 22: Communication unit, 23: State transition processing unit, 101: State chart execution device, 102: External apparatus, 103: State chart information, 104: Binary data, 1001: Processing circuit, 1002: HDD, 1003: Input interface device, 1004: Output interface device, 1005: CPU, 1006: Memory

The invention claimed is:

1. A state chart execution device comprising
a processor to execute a program; and
a memory storing the program which, when executed by the processor, performs processes of,
converting state chart information on a state chart expressing state transition into binary data; and
executing processing of the state chart on a basis of the binary data, wherein
the processes further include:
reading the state chart information and generating pieces of data constituting the state chart;
calculating relevance between the pieces of data constituting the state chart;
binarizing the pieces of data constituting the state chart;
calculating an array of the pieces of data constituting the state chart on a basis of the relevance calculated;
setting an offset indicating a position of each of the pieces of data binarized in a case where the binarized pieces of data are arranged in the array calculated; and
integrating the pieces of data each of which has been binarized and for each of which the corresponding offset has been set in the array calculated to obtain the binary data, wherein
the processes further include:
reading the binary data;
receiving event information from an external apparatus; and
accessing data at a position indicated by the offset set in the binary data when executing the state transition processing of the state chart in accordance with the event information received.

2. The state chart execution device according to claim 1, wherein the processes include calculating relevance on a basis of any one or a combination of: a predetermined rule for calculating the relevance, a usage frequency of each of the pieces of data constituting the state chart, a degree of guidance of the state transition in the state chart, and modification date and time or a modification frequency of each of the pieces of data constituting the state chart.

3. The state chart execution device according to claim 1, wherein the processes include calculating an array so as to arrange pieces of data having high relevance close to each other on a basis of the relevance calculated.

* * * * *